United States Patent [19]

Moore et al.

[11] Patent Number: 5,593,119
[45] Date of Patent: Jan. 14, 1997

[54] APPARATUS AND METHOD FOR MOUNTING A TERMINAL

[75] Inventors: Charles A. Moore, Lawrenceville, Ga.; Douglas J. Kinton, Huber Heights, Ohio

[73] Assignee: AT&T Global Information Solutions Company, Dayton, Ohio

[21] Appl. No.: 371,636

[22] Filed: Jan. 12, 1995

[51] Int. Cl.$^6$ ..................................... F16M 11/10
[52] U.S. Cl. .................. 248/185.1; 188/71.4; 192/54.5; 192/66.2; 192/69.62; 192/69.63; 248/291.1; 248/371; 248/923
[58] Field of Search ................................ 248/371, 291.1, 248/185.1, 664, 665, 919, 920, 922, 923; 192/53.1, 54.5, 66.2, 69.62, 69.63, 93 R; 16/341, 342; 188/70 R, 71.4, 73.2

[56] References Cited

U.S. PATENT DOCUMENTS

| | | | |
|---|---|---|---|
| 365,413 | 6/1887 | Stuart | 16/342 X |
| 984,523 | 2/1911 | Baer | 192/66.2 X |
| 3,692,161 | 9/1972 | Katsuren et al. | 192/93 R X |
| 3,822,768 | 7/1974 | Sebulke | 188/70 R X |
| 4,834,329 | 5/1989 | Delapp | 248/923 |
| 4,919,387 | 4/1990 | Sampson | 248/371 |
| 4,989,813 | 2/1991 | Kim et al. | |
| 5,016,849 | 5/1991 | Wu | 248/371 |
| 5,022,778 | 6/1991 | Lu | |
| 5,108,062 | 4/1992 | Detwiler | 16/342 X |
| 5,125,610 | 6/1992 | Queau | |
| 5,203,434 | 4/1993 | Teeter et al. | 188/70 R X |
| 5,249,103 | 9/1993 | Forsythe | 361/681 X |
| 5,340,073 | 8/1994 | Masakazu | 248/291.1 |

FOREIGN PATENT DOCUMENTS

| | | | |
|---|---|---|---|
| 0464266 | 1/1992 | European Pat. Off. | |
| 0574125A1 | 12/1993 | European Pat. Off. | 248/920 |
| 12356 | 10/1990 | WIPO | |

*Primary Examiner*—Alvin C. Chin-Shue
*Assistant Examiner*—Michael J. Turgeon
*Attorney, Agent, or Firm*—Paul W. Martin

[57] ABSTRACT

A terminal mounting apparatus provides unlimited tilt positions in an operating range while also providing a stable surface for operating a terminal. The mounting apparatus includes a base member, a top member, a pivot member for connecting the base member and the top member, and a conical clutch mechanism located around the pivot member for maintaining the top member in unlimited tilt positions. The conical clutch mechanism includes a plunger with a cam, a foam spring pad, and a floating clutch plate.

6 Claims, 5 Drawing Sheets

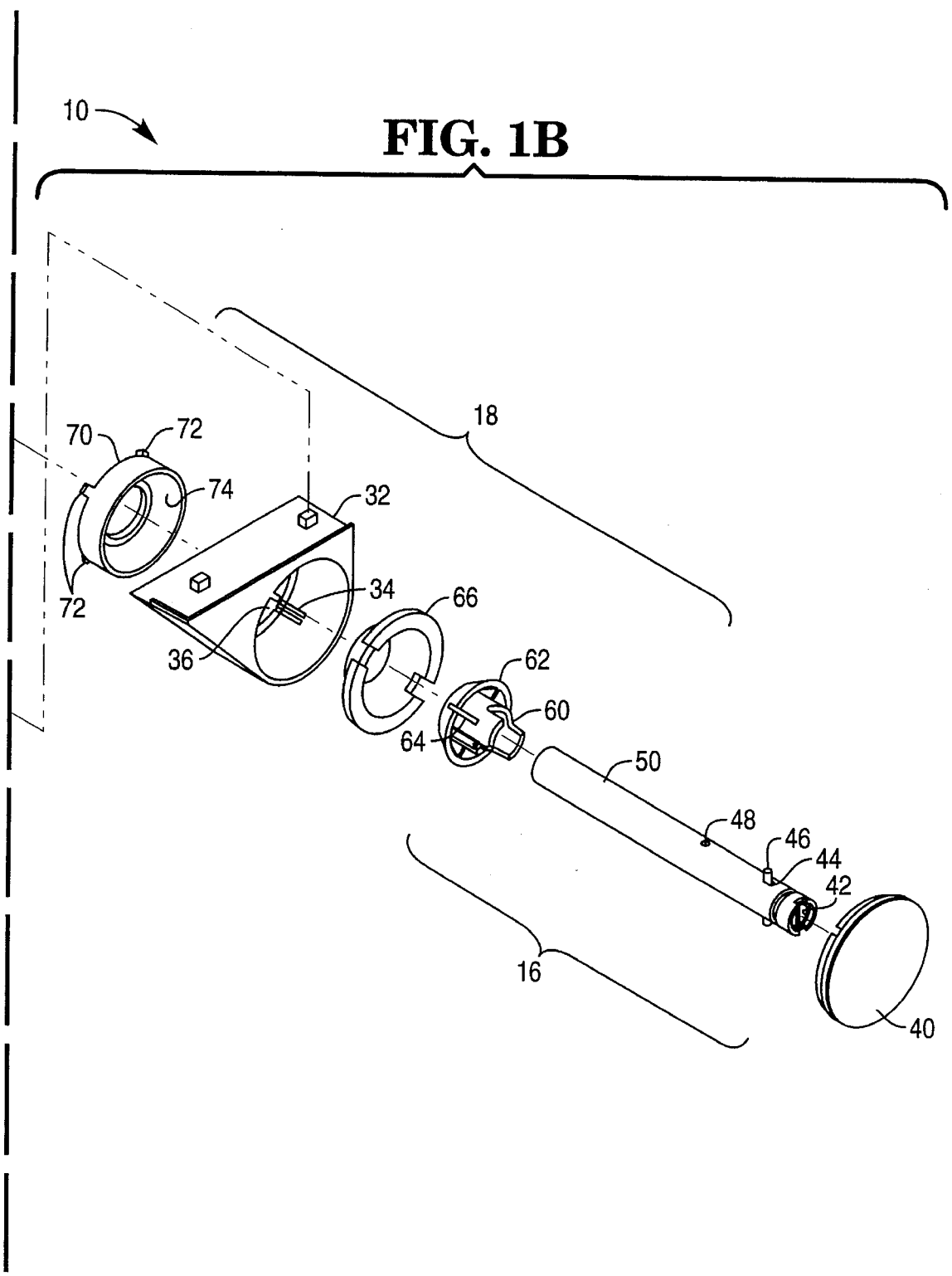

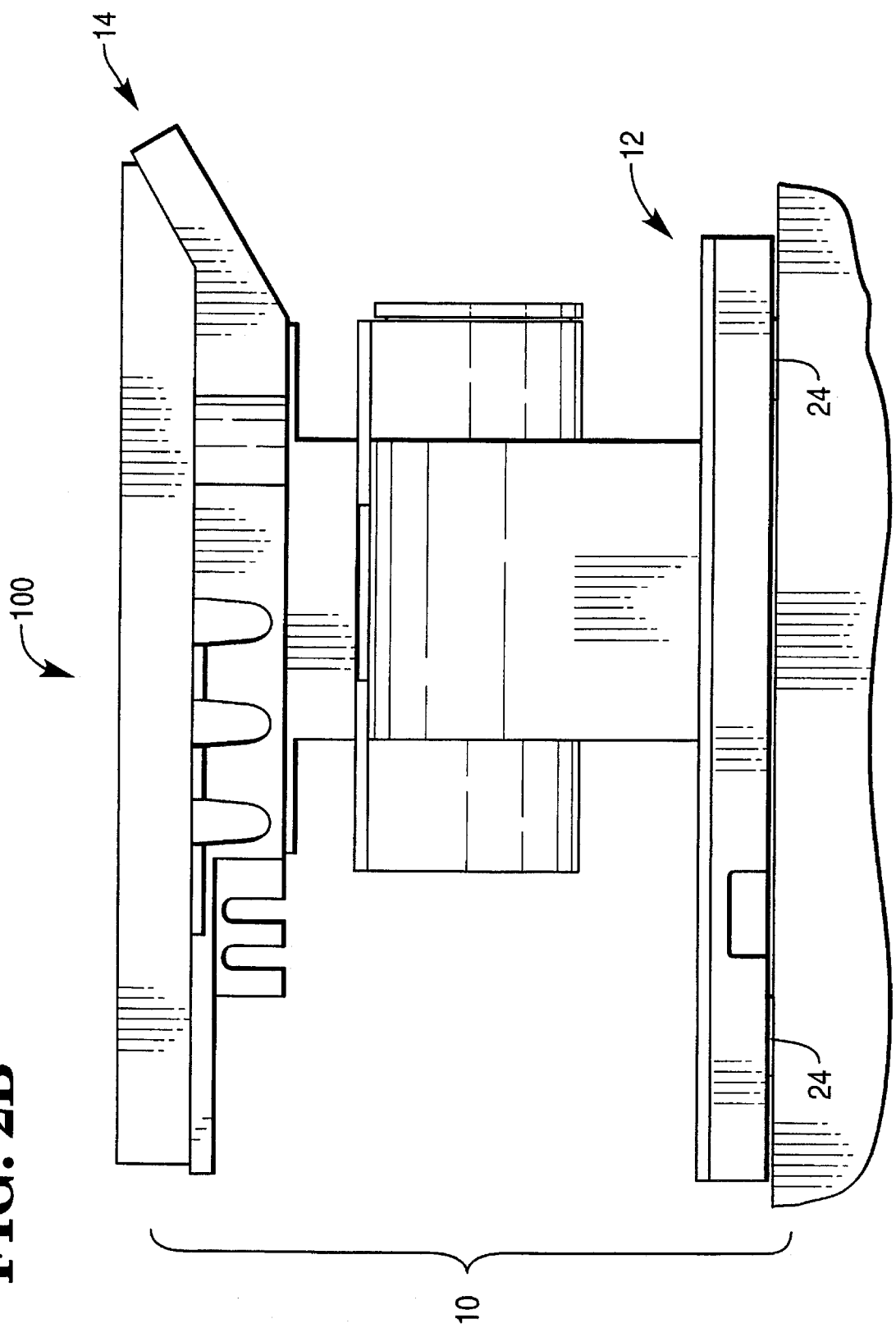

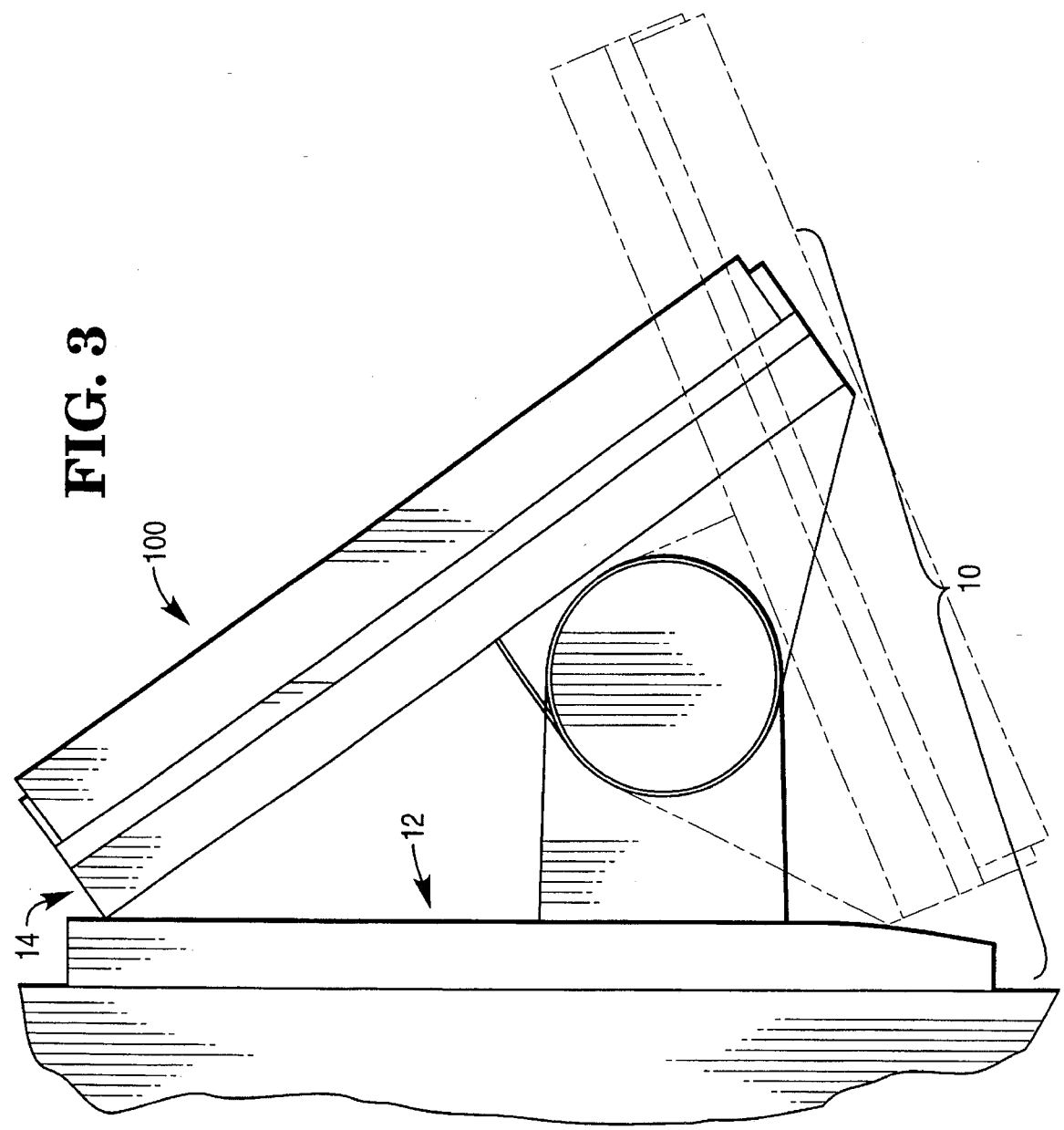

APPARATUS AND METHOD FOR MOUNTING A TERMINAL

BACKGROUND OF THE INVENTION

The present invention relates to an apparatus and method for mounting a terminal.

Retail terminals having touch screens are well known. These terminals have generally been mounted in a fixed position. However, since ambient light can cause glare on the screen and multiple users may desire various mounting angles, adjustable mounting devices are desirable. Some adjustable mounting devices only have predetermined fixed tilt positions, such as those using a ratcheting mechanism. Other mechanisms for adjustable mounting provide multiple tilt positions but do not provide the stable touch surface needed for proper tactile feedback, as required when using a touch screen.

Therefore, it would be desirable to provide a terminal mounting apparatus which provides unlimited tilt positions in an operating range while also providing a stable surface for operating a terminal.

SUMMARY OF THE INVENTION

In accordance with the teachings of the present invention, an adjustable apparatus for mounting a terminal is provided. The mounting apparatus includes a base member, a top member, a pivot member for connecting the base member and the top member, and a conical brake mechanism located around the pivot member for maintaining the top member in unlimited tilt positions. The conical brake mechanism includes a plunger with a cam, a foam spring pad, and a floating brake plate.

It is an important feature of the present invention that the mounting apparatus provides unlimited tilt positions within an operating range.

It is also an important feature of the present invention that the mounting apparatus provides a stable touch surface for providing proper tactile feedback for touch screen operation.

It is accordingly an object of the present invention to provide an adjustable mounting apparatus.

It is another object of the present invention to provide a mounting apparatus which enables unlimited tilt positions within an operating range.

It is another object of the present invention to provide a mounting apparatus which provides unlimited tilt positions within an operating range while also providing a stable surface for operating a terminal with a touch screen.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIGS. 1A and 1B are exploded views of the mounting apparatus of the present invention;

FIGS. 2A and 2B are side views of a terminal secured to the mounting apparatus of the present invention with the base member either vertical or horizontal; and FIG. 3 demonstrates the operating range of the mounting apparatus of the present invention.

DETAILED DESCRIPTION OF THE PREFERRED EMBODIMENT

Figure 1A:
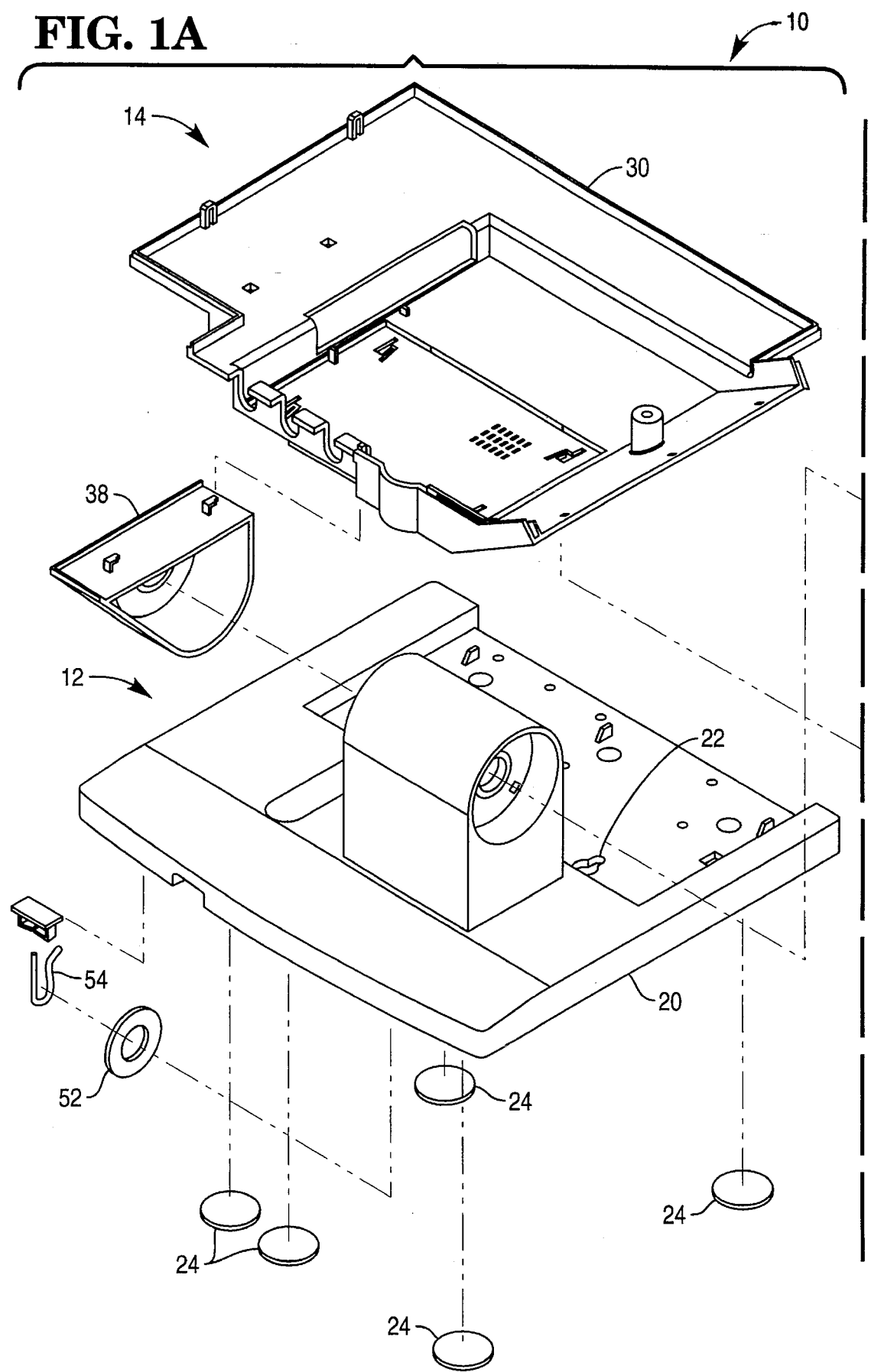

Referring now to the drawings, in which like-referenced characters indicate corresponding elements throughout the several views, attention is first drawn to FIGS. 1A and 1B which show a terminal mounting apparatus 10 of the present invention. Terminal mounting apparatus 10 includes base member 12, top member 14, pivot member 16 and conical brake mechanism 18.

Base member 12 includes base plate 20 which has mounting apertures 22, such as those found on a standard telephone, for securing terminal mounting apparatus 10 on a vertical surface, such as a wall. Base plate 20 also has mounting pads 24 to enable the placement of terminal mounting apparatus 10 on a horizontal surface without sliding or damaging the surface.

Top member 14 includes terminal mounting plate 30, first top pivot member 32, and second top pivot member 38. First top pivot member 32 has first top pivot member conical region 36, preferably of ABS-type plastic, preferably having a taper of about 60°. Top pivot members 32 and 38 connect terminal mounting plate 30 to pivot member 16. First top pivot member 32 also has notches 34 for connecting first top pivot member 32 to conical brake mechanism 18. Terminal mounting plate 30 contains the necessary attachments and venting for whatever device is selected to be mounted on terminal mounting apparatus 10. These necessary attachments are well-known and are beyond the scope of the present invention. Top pivot members 32 and 38 are detachable from terminal mounting plate 30 so that various mounting plates can be used in terminal mounting apparatus 10.

Pivot member 16 includes shaft 50 with handle 40, apertures 44 and 48, cross pin 46, shaft retainer 54, and support washer 52. Handle 40 is located at one end of shaft 50 and fits into the edge of first top pivot member 32 opposite first top pivot member conical region 36. Shaft 50 has aperture 44 for cross pin 46 to pass through, and screw 42 adjusts the position of cross pin 46. Shaft 50 also has aperture 48 for shaft retainer 54 to pass through.

Brake mechanism 18 includes plunger 62, foam spring pad 66, and floating brake plate 70. Plunger 62 contains a cam, and cross pin 46 rides in cam groove 60. Plunger 62 has a conical region about its base, preferably having substantially the same taper as first top pivot member conical region 36. Plunger 62 also has wings 64 extending beyond the conical region. Foam spring pad 66 nests against plunger 62. Foam spring pad 66 has a conical shape, preferably having substantially the same degree of taper as plunger 62. Foam spring pad 66 is preferably rubber, however, other compressible materials may be substituted. Foam spring pad 66 nests against first top pivot member conical region 36. Floating brake plate 70, preferably of nylon filled with talc, has tapered inner surface 74, preferably having substantially the same degree of taper as first top pivot member conical region 36. First top pivot member conical region 36 nests against floating brake plate tapered inner surface 74. Floating brake plate 70 also has tabs 72 which secure floating brake plate 70 to base plate 20.

In operation, brake mechanism 18 must be initially set (such as at the factory) to develop a predetermined frictional force between first top pivot member conical region 36 and floating brake plate tapered inner surface 74. As shaft 50 turns, cross pin 46 rides in cam groove 60 of plunger 62. Rotation of shaft 50 causes an axial motion of plunger 62, and thus, the conical region of plunger 62 compresses conical foam spring pad 66. Compressed foam spring pad 66 presses against first top pivot member conical region 36. This pressure forces first top pivot member conical region 36 against floating brake plate tapered inner surface 74. Floating brake plate 70 cannot move axially since it is attached to, and pressed against, base plate 20. Shaft 50 is prevented from backing out by shaft retainer 54 and support washer 52.

The initial setting provides a predetermined frictional force between first top pivot member 32 and floating brake plate 70. This force, or resistance to rotation, must be overcome to adjust the tilt position of top member 14 and also must be a sufficient force to maintain top member 14 in any tilt position. Thus, first top pivot member conical region 36 and floating brake plate tapered inner surface 74 have a frictional fit.

In routine operation (after a predetermined frictional force has been established between first top pivot member 32 and floating brake plate 70) when adjustment of the tilt position of top member 14 is desired, a force must be applied to top member 14 causing pivot member 16 to rotate. To begin rotation of pivot member 16, the force applied to tilt top member 14 must overcome the pre-existing frictional force (determined when initially setting brake mechanism 18 as described above) between floating brake plate tapered inner surface 74 and first top pivot member conical region 36. When pivot member 16 is rotated, all parts of brake mechanism 18 rotate except floating brake plate 70. Pivot member 16 stops rotating when the force on top member 14 is no longer large enough to overcome the frictional forces between first top pivot member conical region 36 and floating brake plate tapered inner surface 74. The frictional forces in brake mechanism 18 maintain pivot member 16, and thus top member 14, in its last location. Maintaining pivot member 16 and top member 14 at any location when the force is removed provides unlimited tilt positions. The frictional force is large enough to provide a stable surface even when, for example, a touch screen mounted on top member 14 is operated. Although this description provides for brake mechanism 18 to hold the position of top member 14 on a rotating shaft, brake mechanism 18 may be used to hold the position of any device on a rotating shaft.

Figure 2A:
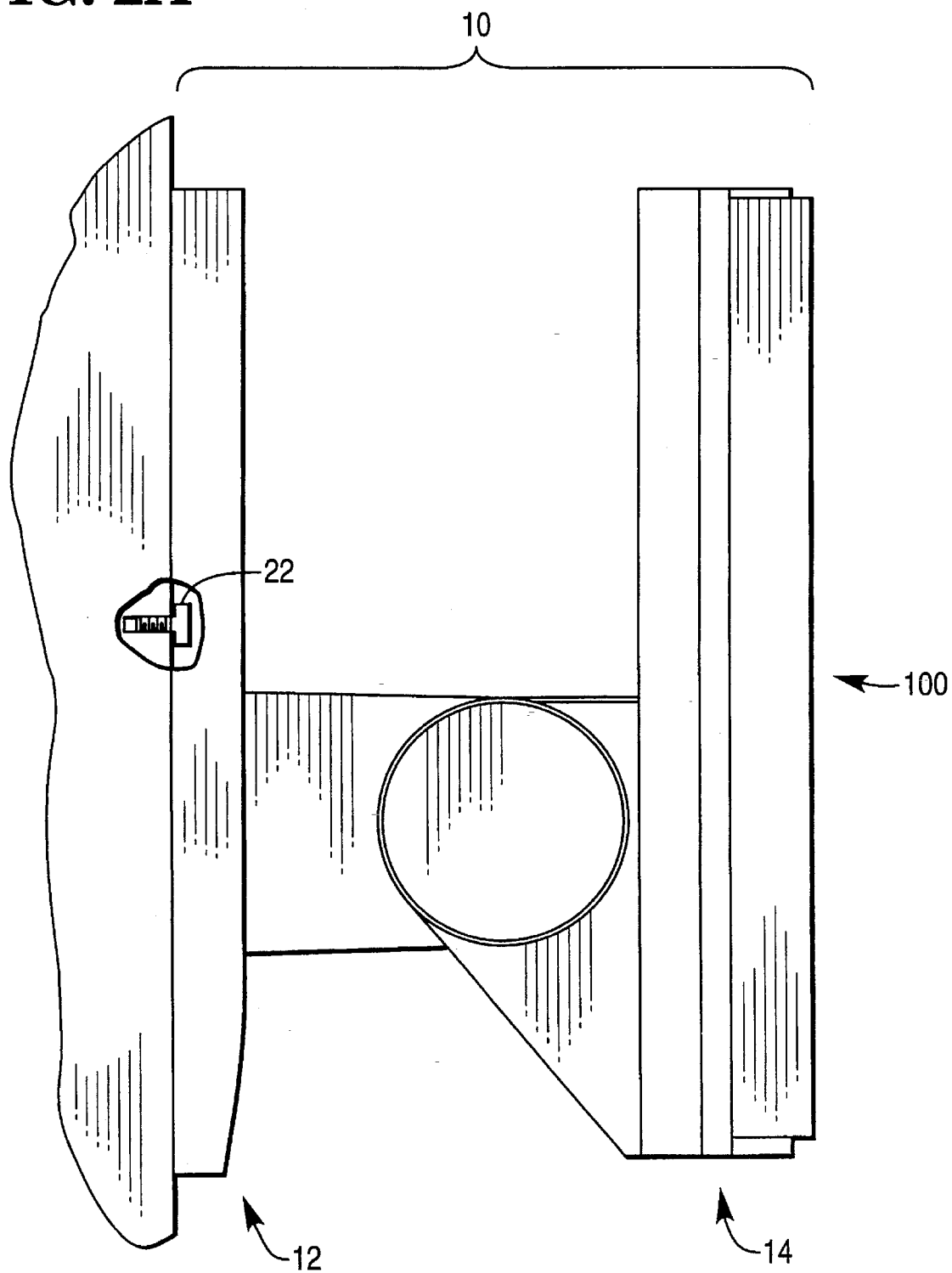

Referring now to FIGS. 2A and 2B, terminal 100 is shown secured to top member 14 of terminal mounting apparatus 10. Base member 12 of terminal mounting apparatus 10 may be either vertical or horizontal. As shown in FIG. 2A, when vertical, base member 12 may be held by screws or other such mounting devices through mounting apertures 22 in base member 12. As shown in FIG. 2B, when horizontal, base member 12 may rest on mounting pads 24.

In FIG. 3, the limits of the operating range are shown. Top member 14 of terminal mounting apparatus 10 can be adjusted to unlimited tilt positions within these limits, but obvious mechanical interference with base member 12 prohibits tilt positions outside these limits. Thus, terminal 100 mounted on top member 14 can be maintained at unlimited tilt positions within the limits shown.

Advantageously, mounting apparatus provides unlimited tilting in the operating range to increase operator comfort and reduce glare from ambient light.

Although the invention has been described with particular reference to certain preferred embodiments thereof, variations and modifications of the present invention can be effected within the spirit and scope of the following claims.

What is claimed is:

1. A mounting apparatus comprising:

a base member;

a top member;

a pivot member for connecting the base member and the top member wherein the pivot member further includes a shaft, a cross pin extending through the shaft, and a shaft retainer for securing the shaft to the base member; and a conical brake mechanism located around the pivot member for adjusting and maintaining the position of the top member wherein the conical brake mechanism further includes:

a plunger having a conical base, a cam groove, and a pair of wings to secure the plunger to the top member;

a conical foam spring pad nesting to the conical base of the plunger; and a floating brake plate having a tapered inner surface which has a friction fit with the top member and also having tabs for securing the floating brake plate to the base member.

2. A mounting apparatus comprising:

a base member;

a top member;

a pivot member for connecting the base member and the top member; and a conical brake mechanism located around the pivot member for adjusting and maintaining the tilt position of the top member, wherein the conical brake mechanism further includes:

a plunger having a conical base, a cam groove, and a pair of wings to secure the plunger to the top member;

a conical foam spring pad nesting to the conical base of the plunger; and a floating brake plate having a tapered inner surface which has a friction fit with the top member and also having tabs for securing the floating brake plate to the base member.

3. A conical brake mechanism for a device on a rotating shaft comprising:

a floating brake plate which has a conical region and which attaches to a non-rotating base member;

a plunger having a conical base and a cam groove in which a cross pin attached to the rotating shaft rides; and a conical foam spring pad nesting to the conical base of the plunger;

wherein the movement of the cross pin in the cam groove causes an axial force on the plunger and the foam spring pad, providing a friction fit between the device on the rotating shaft and the floating brake plate.

4. A touch screen terminal mounting apparatus comprising:

a terminal having a touch screen;

a base member;

a top member attached to the terminal;

a pivot member for connecting the base member and the top member; and a conical brake mechanism located around the pivot member for adjusting and maintaining the tilt position of the top member, wherein the conical brake mechanism further includes:

a plunger having a conical base, a cam groove and a pair of wings to secure the plunger to the top member;

a conical foam spring pad nesting to the conical base of the plunger; and a floating brake plate having a tapered inner surface which has a friction fit with the top member and also having tabs for securing the floating brake plate to the base member.

5. A method for adjustably mounting a top member to a base member comprising the steps of:
   (a) providing a pivot member for coupling the top member and the base member;
   (b) providing a conical brake mechanism surrounding the pivot member, wherein the conical brake mechanism has a friction fit which resists rotation of the pivot member including the steps of
      (b1) applying force to a plunger,
      (b2) providing a foam spring pad which nests against the plunger,
      (b3) providing a top pivot member which nests against the foam spring pad,
      (b4) providing a floating brake plate, wherein the force on the plunger causes an axial force on the foam spring pad and the top pivot member causing a friction fit between the top pivot member and the floating brake plate;
   (c) applying a rotational force on the top member sufficiently large to overcome the resistance due to the friction fit and to tilt the top member; and
   (d) removing the rotational force from the top member when a desired tilt position is reached.

6. A mounting apparatus comprising:
   a base member;
   a top member;
   a pivot member for connecting the base member and the top member; and
   a conical mechanism including
      a plunger having a conical base, a cam groove, and being secured to the top member;
      a conical foam spring pad nesting to the conical base of the plunger; and
      a floating plate having a tapered inner surface which has tabs for securing floating plate to the base member and also has a friction fit with the top member to enable adjusting and maintaining the tilt position of the top member.

* * * * *